(12) United States Patent
Baensch et al.

(10) Patent No.: US 6,863,909 B2
(45) Date of Patent: Mar. 8, 2005

(54) CREAM-BASED FOOD COMPOSITION

(75) Inventors: Johannes Baensch, Le Breuil-en-Auge (FR); Marlène Gaugaz, Corseaux (CH); Dominique Leneuf, Vevey (CH); Ernst Hartmut Reimerdes, Cully/Villette (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/511,780

(22) Filed: Feb. 23, 2000

(65) Prior Publication Data

US 2002/0122864 A1 Sep. 5, 2002

Related U.S. Application Data

(63) Continuation-in-part of application No. PCT/EP98/04930, filed on Jul. 23, 1998.

(30) Foreign Application Priority Data

Aug. 28, 1997 (EP) .............................................. 97202631

(51) Int. Cl.[7] .......................... A23G 3/00; A23L 13/00; A23L 13/14; A23L 13/16; A23C 9/123
(52) U.S. Cl. .......................... 426/61; 426/34; 426/570; 426/572; 426/580; 426/586; 426/94; 426/128
(58) Field of Search .......................... 426/34, 570, 572, 426/61, 580, 586, 106, 128, 130, 297, 94, 89, 283

(56) References Cited

U.S. PATENT DOCUMENTS

| | | | | |
|---|---|---|---|---|
| 3,929,892 A | * | 12/1975 | Hynes et al. ................. | 426/582 |
| 4,145,449 A | * | 3/1979 | Nelham ....................... | 426/120 |
| 4,289,788 A | * | 9/1981 | Cajigas ........................ | 426/61 |
| 4,721,622 A | * | 1/1988 | Kingham et al. ............. | 426/94 |
| 4,732,772 A | * | 3/1988 | Nolte .......................... | 426/573 |
| 4,737,374 A | * | 4/1988 | Huber et al. ................. | 426/565 |
| 4,762,725 A | * | 8/1988 | Player et al. ................. | 426/582 |
| 4,818,554 A | * | 4/1989 | Giddey et al. ............... | 426/564 |
| 4,855,155 A | | 8/1989 | Cavallin ...................... | 426/564 |
| 4,913,921 A | * | 4/1990 | Schroeder et al. ........... | 426/321 |
| 5,145,697 A | * | 9/1992 | Cajigas ........................ | 426/43 |
| 5,175,013 A | * | 12/1992 | Huang et al. ................. | 426/565 |
| 5,202,146 A | * | 4/1993 | Singer et al. ................. | 426/613 |
| 5,252,352 A | * | 10/1993 | Banach et al. ............... | 426/580 |
| 5,520,946 A | | 5/1996 | Chablaix et al. ............. | 426/570 |
| 5,573,793 A | | 11/1996 | Saintain ....................... | 426/34 |
| 5,624,702 A | * | 4/1997 | Schotel ........................ | 426/603 |
| 5,800,855 A | * | 9/1998 | Rosen .......................... | 426/565 |
| 6,299,916 B1 | * | 10/2001 | Dally et al. .................. | 426/94 |
| 6,322,829 B1 | * | 11/2001 | McGlynn et al. ............. | 426/89 |

FOREIGN PATENT DOCUMENTS

| | | | | |
|---|---|---|---|---|
| DE | 40 32 698 | | 8/1991 | |
| DE | 196 15 369 | | 10/1996 | |
| DE | 19650106 A | * | 11/1997 | ............ A23G/3/00 |
| EP | 0 256 561 | | 2/1988 | |
| EP | 0 440 203 | | 8/1991 | |
| EP | 0 607 471 | | 7/1994 | |
| EP | 0 666 031 | | 8/1995 | |
| EP | 0 687 420 | | 12/1995 | |
| EP | 0 714 608 | | 6/1996 | |
| EP | 666031 A | * | 7/1996 | .......... A21D/13/00 |
| EP | 0 818 149 | | 1/1998 | |
| EP | 773722 B1 | * | 10/1998 | ............ A23C/9/15 |
| GB | 2 241 421 | | 9/1991 | |
| GB | 2305844 A | * | 4/1997 | ............ A23L/1/19 |
| HU | 214188 A | * | 4/1998 | .......... A21D/13/08 |

OTHER PUBLICATIONS

Tamime, et al., Yogurt Science and Technology, 1985, Pergamon Press, p. 393.*
Webb et al. , Fundamentals of Dairy Chemistry, AVI Publishing Company, Inc. , pp. 39–41.*
Gebhardt et al, Oct. 2002, Nutritive Value of Foods, USDA, Home and Garden Bulletin No. 72, pp. 16–22.*

* cited by examiner

Primary Examiner—Milton I. Cano
Assistant Examiner—Robert Madsen
(74) Attorney, Agent, or Firm—Winston & Strawn LLP

(57) ABSTRACT

A process for the preparation of a cream, in which a mixture containing about 10% to 20% of milk derivatives, about 8% to 30% of sugars, about 10% to 60% of fermented dairy product, about 0% to 25% of sour cream or of dairy cream containing about 25% to 45% of fatty substance, about 0% to 35% of texturizing agent, about 0% to 20% of aromatic product, and about 0% to 0.5% of salt is prepared by stirring, heat treating at a temperature of about 60° C. to 115° C. for about 7 seconds to 5 minutes; the temperature of the mixture is then adjusted to about 15° C. to 40° C. and to which molten fatty substance is added with stirring, so as to obtain a homogeneous cream. The cream thus obtained can be used in the manufacture of a food composition by depositing it on at least one layer, preferably between two layers, of food product, e.g., a biscuit.

17 Claims, No Drawings

CREAM-BASED FOOD COMPOSITION

CROSS-REFERENCE TO RELATED APPLICATIONS

This is a continuation-in-part of PCT Application No. PCT/EP98/04930, filed Jul. 23, 1998, the content of which is expressly incorporated herein by reference thereto.

FIELD OF INVENTION

This invention relates to cream-based food compositions and processes for preparing the same. More particularly, the invention relates to the use of these cream compositions and processes in the manufacture of particular food compositions.

BACKGROUND OF THE INVENTION

In numerous applications, such as those required by the food processing industry, a simple and rapid process for the production of a cream with a creamy texture and fresh taste is desirable. The preparation of certain cream-based food compositions is generally known for this purpose.

European Patent Application 0714608 describes a process for the manufacture of appetizers from a mixture containing in particular soft white cheese. This soft white cheese is pasteurized and cooled to 10° C. before being extruded and then frozen, so that it can then be cut into portions which are subsequently coated with a fat-based topping.

Furthermore, European Patent Application 0687420 describes a process for the manufacture of a biscuit coated and filled with a cream containing living lactic acid bacteria, exhibiting a water activity ($A_w$) of 0.75–0.86 and comprising a sufficient amount of fatty substance so that it is in the form of a water-in-oil emulsion.

European Patent Application 0818149 discloses an aerated food composition constituted by an oil-in-water emulsion comprising 20% to 45% fats, milk proteins, possibly sugars, and 20% to 38% water, having an acid pH of from 3.5 to 6 and obtained by emulsifying a mixture of an aqueous phase based on fresh cheese, yogurt or sour cream and a fat phase comprising butter or vegetable fat, followed by pasteurizing the emulsion and foaming.

Despite these prior art formulations, there remains a need for creams that have a creamy texture and a fresh taste for use in the manufacture of food compositions.

SUMMARY OF THE INVENTION

The present invention relates to a simple and rapid process for producing a cream composition having a creamy texture and a fresh taste, and to a process for producing this cream.

The process according to the present invention, comprises preparing a mixture that typically contains from about 10% to 20% of milk derivatives, from about 8% to 30% of sugars, and from about 10% to 60% of fermented dairy product. The mixture may contain up to about 25% of sour cream or of dairy cream containing from about 25% to 45% of fatty substance, up to about 35% of a texturizing agent, up to about 20% of an aromatic product and up to about 0.5% of salt. The mixture is prepared by stirring together the ingredients. This mixture is then heat treated at a temperature of about 60° C. to 115° C. for about 7 seconds to 5 minutes. Next, the temperature of the mixture is adjusted to about 15° C. to 40° C., and about 10% to 45% of a molten fatty substance, with respect to the total weight of the mixture, is added to the mixture with stirring, so as to obtain a homogeneous cream which exhibits an $A_w$ of about 0.80 to 0.91.

In one embodiment, the milk derivative includes at least one of powdered unskimmed milk, powdered skimmed milk, sweetened evaporated milk, or combinations thereof. In another embodiment, the fermented dairy product includes at least one of fermented milk, yogurt, cream cheese, powdered fermented milk diluted in milk or water, powdered yogurt diluted in water or milk, concentrated yogurt, concentrated cream cheese, powdered cream cheese, quark diluted in water or milk, or combinations thereof. The sour cream or dairy cream is preferably present in an amount from about 0.01% to 25% of the mixture to increase the organoleptic or smoothness qualities of the mixture.

When used, the texturizing agent is present in an amount from about 0.01% to 35% and includes at least one of maltodextrin, fermented cereal product, or combinations thereof. Similarly, the aromatic product is present in an amount from about 0.01% to 20% and includes at least one of honey, cocoa, coffee, caramel, hazel-nuts, almonds, vanilla, fruit chunks, whole fruits, fruit syrups, concentrated fruit juices, or combinations thereof. Also, the salt is preferably present in an amount from about 0.01% to 0.5%.

In another embodiment, the invention includes adjusting the pH of the mixture to about 4 to 6 before the mixture is heat treated. If desired, a plurality of living lactic acid bacteria can be added to the mixture at a concentration of about $10^8$ to $10^{11}$ per gram of the mixture after having adjusted the temperature of the mixture to about 15° C. to 40° C. Aeration of the homogenous cream is possible.

The invention also relates to a cream-based food composition that includes the previously described mixtures. This composition may be disposed on at least one layer of a biscuit. In a preferred embodiment, the composition is disposed between each layer of a biscuit having two layers. In another embodiment, the food composition preferably has a water activity ($A_w$) of about 0.75 to 0.88.

DETAILED DESCRIPTION OF THE INVENTION

It has now been discovered that the process according to the present invention makes it possible to produce a cream that retains a creamy texture and a fresh taste even after 45 days at refrigerator temperature. The cream according to the present invention has the advantage of being edible directly after storage at refrigerator temperature or several hours after having been exposed to room temperature.

In this description, the expression "milk derivative" will be employed to denote powdered skimmed milk, powdered unskimmed milk or sweetened evaporated milk, while the term "biscuit" will be employed to denote any dough-based preparation, such as sponge cake, pound cake, gingerbread, brioche rolls, or Viennese bread and buns.

In order to make use of the present process, a specific mixture is prepared. This mixture typically contains about 10% to 20%, and preferably from about 15% to 19%, of a milk derivative; from about 8% to 30%, preferably from about 12% to 22%, of a sugar; and from about 5% to 60%, and preferably from about 10% to 35%, of a fermented dairy product. A number of optional ingredients may be included, if desired. For example, from about 0% to about 25%, and preferably from about 5% to 15%, of sour cream or of a dairy cream containing from about 25% to about 45% of a fatty substance of the sour cream or dairy cream; from about 0% to about 35%, and preferably from about 10% to 25%, of a texturizing agent; from about 0% to about 20%, and preferably from about 5% to 15%, of an aromatic product; and from about 0% to about 0.5%, preferably from about 0.1% to 0.4%, of salt may be used. The mixture is thus prepared by stirring the ingredients in any suitable mixing device, such as a turbomixer. The mixture according to the present invention can also be formulated to contain a supplement of inorganic salts, functional nutritional compounds and/or vitamins in conventional amounts.

It is possible to use any suitable form of sugar, such as sucrose, invert sugar syrup, glucose syrup, honey, or combinations thereof.

It is possible to use any suitable type of fermented dairy product, such as fermented milk, yogurt, cream cheese, powdered fermented milk diluted in milk or in water, powdered yogurt diluted in water or in milk, concentrated yogurt, concentrated cream cheese, powdered cream cheese, quark diluted in water or in milk, or combinations thereof.

It is possible to use sour cream or dairy cream containing from about 25% to 45% of fatty substance, so as to increase the organoleptic qualities of the mixture, in particular its smoothness. When the sour cream or dairy cream is included, it is preferably present in an amount of at least about 0.01%.

Maltodextrin, fermented cereal product, or combinations thereof, can optionally be included as a texturizing agent, so as to give body to the mixture while limiting its sweet flavor. When the texturizing agent is included, it is present in an amount from at least about 0.01%.

It is also possible to include an aromatic product, such as honey, cocoa, coffee, caramel, hazelnuts, almonds, vanilla, fruit syrup, concentrated fruit juices, or combinations thereof. When the aromatic product is included, it is present in any taste perceptible amount and generally at least about 0.01%.

It is also possible to include a flavoring agent, such as cocoa, coffee, hazelnuts, vanilla, or fruit flavors, in solid, powdered, or liquid form, or combinations thereof. The flavoring agent can be added in any desired amount, but typically is included in an amount of at least about 0.1% by weight of the mixture.

It is also optional, but preferred, to include lemon, cherries, strawberries, raspberries, blackberries, apricots or peaches as whole fruits, fruit chunks, or combinations thereof. The whole fruits and fruit chunks can be candied fruits, uncandied fruits, semi-candied fruits, or freeze-dried fruits, and can be added in an amount of between 2 and 25% by weight of the mixture.

Before the heat treatment, the pH of the mixture is preferably adjusted to about 4 to 6, depending on the acidity of the aromatic product contained in the mixture. In the case where the aromatic product is acidic, the pH of the mixture is very precisely adjusted, so as not to destroy the smooth structure of the mixture. When too high, the pH can be adjusted by adding from about 0.1% to 2% of an organic acid, such as lactic or citric acid, to the mixture. One of ordinary skill in the art will be readily be able to determine other suitable acidic or basic agents that are edible and suitable for adjusting the pH.

The mixture is then heat treated at about 60° C. to 115° C. for approximately 7 seconds to 5 minutes, so as to pasteurize it. If it is desired to set the mixture aside before adding the fatty substance thereto, it is possible, if appropriate, to cool it, so as to store it at about 8° C. to 20° C. and to maintain it thus under good hygienic conditions. The temperature of the mixture is then subsequently adjusted to about 15° C. to 40° C. It is possible to incorporate, in the mixture, from about 0.02% to 0.5% of crystalline lactose per 100 g of mixture, after having adjusted the temperature of the mixture to the temperature range of about 15° C. to 40° C.

Living lactic acid bacteria can then optionally be added to the mixture at a concentration of about $10^8$ to $10^{11}$, per gram of mixture, after having adjusted the temperature of the mixture to the temperature range of about 15° C. to 40° C. The living lactic acid bacteria can be added in dried form, in the form of a fresh or frozen concentrated culture, or in the form of a fermented dairy product. By adding this concentration of live bacteria during preparation, the desired final levels can be achieved. The final concentration would be between about $10^4$ to $10^9$ per gram.

From about 10% to 45% of a molten fatty substance, with respect to the total weight of the mixture, is then added to the mixture with stirring, so as to obtain a homogeneous cream that exhibits an $A_w$ from about 0.80 to 0.91. In one embodiment, the $A_w$ is from about 0.86 to 0.91, and in another embodiment, the $A_w$ is from about 0.87 to 0.91. The fatty substance can be vegetable fat, the melting point of which is greater than about 30° C., or a mixture of such vegetable fats and of animal fat. In particular, butter is the most preferred fatty substance.

It is then possible to aerate the cream, so as to make it lighter. It is possible in particular to aerate it by incorporating therein, by continuous injection, in particular from about 25 ml to 150 ml of an inert gas, such as nitrogen or other gases, typically air or carbon dioxide, per 100 g of cream. If desired, it is also possible to utilize the cream without aeration.

Another subject of the present invention is a food composition comprising a cream obtained by the process, which cream is then cooled and deposited on at least one layer of biscuit, preferably between two layers of biscuit.

Moreover, this food composition can be stored for at least 45 days at typical refrigerator temperatures, that is to say at about 4° C. to 8° C. The food composition according to the present invention can be consumed immediately after storage at refrigerator temperature or a few hours, in particular about 3 h to 12 h after having been removed from a refrigeration area and having been left at room temperature.

The food composition can be coated entirely or partially with chocolate, a chocolate substitute, or an icing of the fondant type.

Moreover, the food composition according to the present invention can contain, in the cream or in the biscuit, lactic acid bacteria at a final concentration of about $10^4$ to about $10^9$ per gram of the food composition.

EXAMPLES

The preparation process and the food composition according to the present invention are described in more detail in the examples below where the percentages are given by weight, except when otherwise indicated.

Example 1

A food composition with a strawberry aroma is prepared.

To do this, a mixture containing 17% of powdered skimmed milk, 14% of sucrose, 2.3% of glucose syrup, 20% of cream cheese, 11% of yogurt, 5% of dairy cream containing 35% of fatty substance, 20% of maltodextrin, 10% of strawberry pulp and 0.7% of powdered strawberry essence is prepared with stirring in a turbomixer.

The pH of the mixture is adjusted to 4.4 by adding 1.5% of lactic acid thereto.

The viscosity of the mixture is measured using a Brookfield viscometer sold by the Company Brookfield Engineering Laboratories Inc., Stoughton, USA. The mixture exhibits a viscosity of 7600 cPs (7,600 mPa.s) at 29° C.

The mixture is then heat treated at 80° C. for 3 minutes.

The mixture is then adjusted to 32° C. before incorporating 0.04% of crystalline lactose per 100 g of mixture.

To obtain a homogeneous cream, 20% of molten fatty substance, with respect to the total weight of the mixture is added.

A homogeneous cream is thus obtained which exhibits an $A_w$ of 0.91 and a pH value of 4.3.

Before depositing this homogeneous cream between two layers of a biscuit, it is cooled and then aerated by incorporating therein 70 ml of nitrogen per 100 g of cream.

Using a depositing nozzle, 20 g of this cream are then deposited between two layers of biscuit, each layer weighing 6 g.

A food composition is thus obtained with a strawberry aroma that has a creamy texture and that exhibits a fresh taste.

This composition is wrapped, e.g., in a hermetically closed plastic sachet, and is then stored at refrigerator temperature. It can be readily stored at refrigerator temperatures for 8 weeks.

Example 2

A food composition with a cocoa aroma is prepared.

To do this, a mixture containing 15% of powdered skimmed milk, 18% of sucrose, 4% of invert sugar syrup, 19% of cream cheese, 14% of yogurt, 6% of dairy cream containing 35% of fatty substance, 19% of maltodextrin, and 5% of powdered cocoa is prepared with stirring in a turbo mixer.

The viscosity of the mixture is measured using a Brookfield viscometer sold by Brookfield Engineering Laboratories Inc., Stoughton, USA. The mixture exhibits a viscosity of 12,000 cPs (12,000 Mpa.s) at 33° C. with an RV5 unit at a rotational speed of 10 rpm.

The mixture is then heat treated at 80° C. for 3 minutes.

The mixture is then adjusted to 32° C. before incorporating 0.04% of crystalline lactose per 100 g of mixture.

To obtain a homogeneous cream, 25% of molten fatty substance with respect to the total weight of the mixture, is then added with stirring.

A homogeneous cream is thus obtained which exhibits an $A_w$ of 0.89 and a pH value of 5.8.

Before depositing this homogeneous cream between two layers of biscuit, it is cooled and then aerated by incorporating therein 60 ml of nitrogen per 100 g of cream.

Using a depositing nozzle, 14 g of this cream are then deposited between two layers of biscuit, each weighing 7 g.

A food composition is thus obtained with a cocoa aroma that has a creamy texture and which exhibits a fresh taste.

This composition is wrapped in a hermetically closed plastic sachet and is then stored at refrigerator temperature.

Example 3

A food composition with a blueberry aroma is prepared.

To do this, a concentrated yogurt with 76% milk, 24% skimmed milk powder, and yogurt ferments is prepared. In this concentrated yogurt, living lactic acid bacteria are present at a concentration of $5 \times 10^8$ per gram of the concentrated yogurt.

A mixture containing 19% of milk, 14% of skimmed milk powder, 17.3% of sugar, 14% of inverted sugar, 20% of maltodextrin, 13% of blueberry pulp, 0.83% of powdered blueberry essence, 1.7% of lactic acid, 0.17% of salt is prepared with stirring in a turbomixer.

The mixture is then pasteurized before adding 0.03% of microcrystalline lactose.

Then 33% of the concentrated yogurt, with respect to the total weight of the mixture, is added with stirring to the mixture.

To obtain a homogeneous cream 33% of molten fatty substance, with respect to the total weight of the mixture, is then added with stirring.

A homogeneous cream is thus obtained which exhibits an $A_w$ of 0.91, a pH of 4.5 and a specific gravity of about 650 g/l. This homogeneous cream contains living lactic acid bacteria at a concentration of $10^8$ per gram of the cream.

Before depositing this homogeneous cream between two layers of biscuit, it is cooled and then aerated by incorporating therein 60 ml of nitrogen per 100 g of cream.

Between two layers of biscuit, each weighing 10 g, 20 g of cream is deposited.

The food composition has an $A_w$ of 0.88 and contains living lactic acid bacteria at a concentration of $5 \times 10^7$ per gram of the food composition. After being chilled for 45 days, the food composition still contains living lactic acid bacteria at a concentration over of $10^6$ per gram of the food composition.

The term "about" as used herein in connection with one or more numbers or numerical ranges, should be understood to refer to all such numbers, including all numbers in a range.

All percentages herein are weight percentages unless otherwise specified.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A food product comprising:
   at least one layer of a biscuit; and
   a cream composition comprising a mixture of:
   10% to 20% of a milk derivative;
   8% to 30% of a sugar comprising sucrose, invert sugar syrup, glucose syrup, honey, or combinations thereof;
   10% to 60% of a fermented dairy product;
   0.01% to 35% of a texturizing agent;
   about 5% to about 25% of sour cream or dairy cream containing 25% to 45% of fatty substances;
   0.01% to 20% of an aromatic product comprising honey, cocoa, coffee, caramel, hazelnuts, almonds, vanilla, fruit chunks, fruit syrup, whole fruits, concentrated fruit juices, or a combination thereof;
   10% to 45% of a molten fatty substance; and
   0.01% to 0.5% of salt;
   wherein the cream composition has a water activity ($A_w$) of 0.75 to 0.91 and is disposed on the at least one layer of the biscuit.

2. The cream composition of claim 1, further comprising living lactic acid bacteria present at a concentration of $10^4$ to $10^{11}$ per gram of mixture.

3. The cream composition of claim 1, wherein the composition has a water activity ($A_w$) of 0.8 to 0.91.

4. The cream composition of claim 1, wherein the milk derivative comprises at least one of powdered unskimmed milk, powdered skimmed milk, sweetened evaporated milk, or combinations thereof, and the milk derivative is present in an amount of 15 weight percent to about 20 weight percent.

5. The cream composition of claim 1, wherein the sour cream or dairy cream is present in an amount sufficient to increase the organoleptic or smoothness qualities of the mixture.

6. The cream composition of claim 1, wherein the texturizing agent comprises at least one of maltodextrin, fermented cereal product, or combinations thereof.

7. The cream composition of claim 1, wherein the salt is present in an amount of about 0.1% to 0.4%.

8. The cream composition of claim 1 in aerated form.

9. The cream composition of claim 1, further comprising at least one fruit which comprises lemon, cherries, strawberries, raspberries, blackberries, apricots, peaches, or mixtures thereof.

10. The cream composition of claim 9, wherein the fruit is present in an amount of 2% to 25% of the composition.

11. The cream composition of claim 9, wherein the fruit is present as whole fruits, fruit chunks, candied fruits, uncandied fruits, semi-candied fruits, freeze-dried fruits, or mixtures thereof.

12. A hermetically closed plastic sachet comprising the cream composition of claim 1.

13. A food product comprising the cream composition of claim 1 disposed between two layers of biscuit each of which comprises cake, gingerbread, brioche roll, or Viennese bread or buns.

14. A food product comprising:
at least one layer of a biscuit; and
a cream composition consisting essentially of:
  10% to 20% of a milk derivative;
  8% to 30% of a sugar comprising sucrose, invert sugar syrup, glucose syrup, honey, or combinations thereof;
  10% to 60% of a fermented dairy product;
  about 5% to about 25% of sour cream or dairy cream containing 25% to 45% of fatty substances;
  0.01% to 35% of a texturizing agent;
  0.01% to 20% of an aromatic product comprising honey, cocoa, coffee, caramel, hazelnuts, almonds, vanilla, fruit chunks, fruit syrup, whole fruits, concentrated fruit juices, or a combination thereof;
  10% to 45% of a molten fatty substance; and
  0.01% to 0.5% of salt;
wherein the cream composition has a water activity ($A_w$) of 0.86 to 0.91 and is disposed on the at least one layer of the biscuit and wherein the cream composition must be maintained under refrigeration to provide a shelf life of at least 45 days.

15. The cream composition of claim 14, having a water activity ($A_w$) of 0.87 to 0.91.

16. The cream composition of claim 14 aerated by injection of about 25 ml to 150 ml of inert gas per 100 grams of cream.

17. The cream composition of claim 2, wherein the cream still contains living lactic acid bacteria at a concentration of over $10^6$/gram of the food composition after being chilled for 45 days.

* * * * *